No. 671,437. Patented Apr. 9, 1901.
W. H. FORD.
HOLDER.
(Application filed Mar. 10, 1900.)
(No Model.)
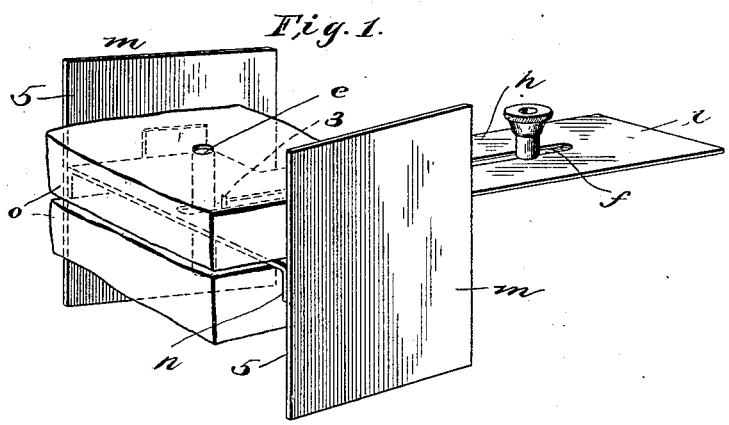
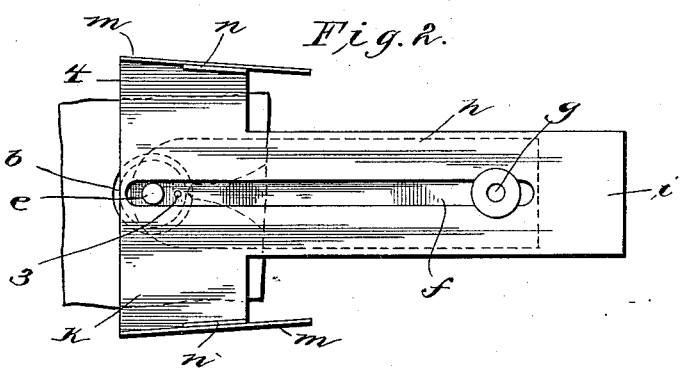
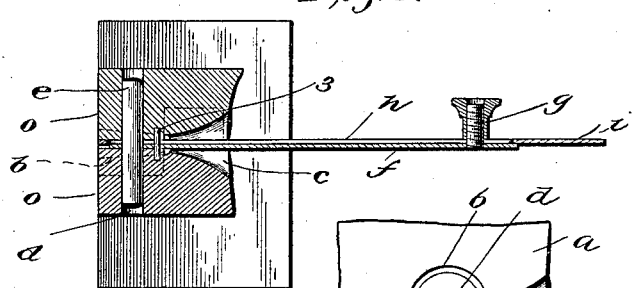
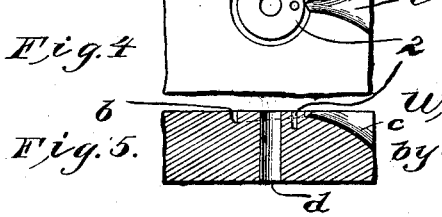
Witnesses.
Inventor
William H. Ford,
by Crosby & Gregory
attys.
THE NORRIS PETERS CO., PHOTO-LITHO., WASHINGTON, D. C.

UNITED STATES PATENT OFFICE.

WILLIAM H. FORD, OF LOWELL, MASSACHUSETTS, ASSIGNOR OF ONE-HALF TO CYRUS W. RUSSELL, OF SAME PLACE.

HOLDER.

SPECIFICATION forming part of Letters Patent No. 671,437, dated April 9, 1901.

Application filed March 10, 1900. Serial No. 8,122. (No model.)

*To all whom it may concern:*

Be it known that I, WILLIAM H. FORD, a citizen of the United States, residing at Lowell, county of Middlesex, State of Massachusetts, have invented an Improvement in Holders, of which the following description, in connection with the accompanying drawings, is a specification, like characters on the drawings representing like parts.

This invention has for its object the production of a holder more especially designed to hold a piece or pieces of charcoal to be cut in the production of a mold for casting. The mold is made by cutting in the face of the material, as charcoal, a groove, preferably annular, and the material when grooved is cut to expose one part of the groove, and it is essential when both parts of the material are put together that said grooves exactly register. To cut these two mold halves or sections, I have devised an apparatus having an adjustable centering-pin to receive the mold material, means being employed to prevent the rotation of the material during the sawing operation, and when the material is adjusted to bring the groove in the said line the material is sawed off.

Figure 1 in perspective shows my improved holder with two pieces of charcoal mounted therein to be cut. Fig. 2 is a plan view of the holder with only the under piece of charcoal in position to be cut. Fig. 3 is a section in the line $x$, Fig. 2, showing both pieces of charcoal in position and cut. Fig. 4 shows the face of a piece of charcoal with the ring-groove and runway, the dotted line $x'$ showing where it will be cut when put in the holder; and Fig. 5, a section of Fig. 4 in the dotted line $x^2$.

To use my holder, I take pieces of charcoal $a$, having an annular groove $b$, a runway $c$, and a central opening $d$, and apply one piece to the centering-pin $e$, illustrated as held in an adjusting device $f$, represented as a bar having an attached threaded stud $g$, extended through a slot $h$ in an extension $i$ of a supporting-plate $k$, represented as sustained in uprights $m$, shown as secured to the plate by soldering said uprights to ears $n$ of the plate, said ears extending both up and down at the ends of the plate. Preferably the outer edge of the plate $k$ is left straight to constitute an alining edge for use in adjusting the undermost mold-section $a$, applied to the centering-pin to put the outer periphery of the core in exactly the place it should occupy (see Fig. 2) before applying to the pin the second or uppermost piece of material (see Figs. 1 and 3) to be cut in the line $x'$, Fig. 4, to leave the mold material faced at $o$ and expose the registered mold-space for the application to the two parts of the mold of a crown-mold section fully described in said application.

The groove herein shown by dotted outline, Fig. 3, is of varying depth to provide for differences in the width of the ring to be cast in the mold-space. Application Serial No. 728,566, filed on the 26th day of August, 1899, shows a device for so cutting the groove. That device has a templet, which is fixed to the mold material by a pin that in its use enters the material and makes in it a hole 2. The hole 2, when the material is applied to the centering-pin, is entered by a positioning-pin 3, said pin alining the pouring-opening and insuring that the shallowest parts of the groove shall be exactly opposite where the two grooves $b$ are to be put in registered position. By adjusting the pin $e$ toward and from the gage-line the edge 4 of the plate $k$, this being done when the set-nut $p$ is loosened, pieces of material having grooves of any desired diameter, according to the finger-size required for the ring to be cast in the mold.

The front edges 5 of the uprights $m$ constitute a guide for the saw or blade used to cut off on the line $x$ the mold material, it having been adjusted into proper position. To cut the material, I prefer to use a saw-blade; but this invention is not limited to the particular shape of the cutting edge of the blade.

Having described my invention, what I claim as new, and desire to secure by Letters Patent, is—

1. A device of the character specified, comprising a plate or holder provided with a centering-pin to enter the material to be cut, and guides connected to and projecting from said plate and against which a cutting-blade may bear.

2. A device of the character specified, comprising a plate or holder, guides projecting from said plate and against which a cutting-blade may bear, and a centering-pin projecting from said plate and adjustable thereon.

3. A device of the character specified, comprising a plate or holder, a centering-pin projecting from said plate and adapted to enter the material to be cut, and uprights connected to said plate on opposite sides of said pin, the edges of which constitute guides for a cutting-blade.

4. A device of the character specified, comprising a plate to the opposite faces of which may be applied mold material, a centering-pin projecting above and below said plate, and guides against which a cutting-blade may bear.

5. A holder presenting guides for a cutting-blade, combined with a centering-pin, and a positioning-pin, both entering the material to be cut.

6. A holder presenting a plate to the opposite faces of which may be applied two pieces of mold material, a centering-pin adapted to receive upon it above and below said plate, one of said pieces of mold material, and an adjustable plate carrying said centering-pin.

7. A plate having an alining edge by which to gage the adjustment of the material to be cut, a centering-pin to engage said material and adjustable toward and from the alining edge, and guides for a cutting-blade projecting from the plate.

In testimony whereof I have signed my name to this specification in the presence of two subscribing witnesses.

WILLIAM H. FORD.

Witnesses:
GEO. W. GREGORY,
EMMA J. BENNETT.